United States Patent
Hu (10) Patent No.: US 8,891,454 B2
(45) Date of Patent: Nov. 18, 2014

(54) METHOD, APPARATUS AND SYSTEM FOR SENDING MESSAGES

(71) Applicant: Tencent Technology (Shenzhen) Company Limited, Shenzhen (CN)

(72) Inventor: Peng Hu, Shenzhen (CN)

(73) Assignee: Tencent Technology (Shenzhen) Company Limited, Shenzhen, Guangdong (CN)

(*) Notice: Subject to any disclaimer, the term of this patent is extended or adjusted under 35 U.S.C. 154(b) by 0 days.

(21) Appl. No.: 13/939,717

(22) Filed: Jul. 11, 2013

(65) Prior Publication Data

US 2013/0294349 A1    Nov. 7, 2013

Related U.S. Application Data

(63) Continuation of application No. PCT/CN2011/084256, filed on Dec. 20, 2011.

(30) Foreign Application Priority Data

Jan. 12, 2011    (CN) .......................... 2011 1 0005298

(51) Int. Cl.
H04W 4/00        (2009.01)
H04W 40/02       (2009.01)
H04W 4/02        (2009.01)

(52) U.S. Cl.
CPC .............. *H04W 40/02* (2013.01); *H04W 4/02* (2013.01)
USPC ............................. 370/328; 370/252; 370/349

(58) Field of Classification Search
USPC .............. 370/229, 230, 252, 310.2, 328, 349, 370/389
See application file for complete search history.

(56) References Cited

U.S. PATENT DOCUMENTS

2008/0188221 A1* 8/2008 Hashimoto et al. ......... 455/435.1
2009/0061863 A1* 3/2009 Huggett et al. ............... 455/434
2010/0120354 A1* 5/2010 Kjellberg ..................... 455/3.01

(Continued)

FOREIGN PATENT DOCUMENTS

CN    1602090 A    3/2005
CN    1694567 A    11/2005

(Continued)

*Primary Examiner* — Kwang B Yao
*Assistant Examiner* — Nguyen Ngo
(74) *Attorney, Agent, or Firm* — Dilworth & Barrese, LLP.

(57) ABSTRACT

The present invention discloses a method for sending messages, including: acquiring a destination region to which an outgoing message is to be sent; determining a first base station identifier corresponding to the destination region, and acquiring a first unique user identifier corresponding to the first base station identifier; and sending the outgoing message to a mobile terminal of a first user, where the first user is a user identified by the first unique user identifier. The present invention also discloses an apparatus for sending messages, including: a destination region acquiring module; a user identifier determining module; and an outgoing message sending module. According to the embodiments of the present invention, a first base station identifier corresponding to the destination region is determined, a first unique user identifier corresponding to the first base station identifier is acquired, and the outgoing message is sent to the a corresponding first user, such that a server is capable of acquiring information of actual geographical location of a mobile terminal user. This improves precision in sending messages to mobile terminal users according to regions, and enhances effects of information release.

8 Claims, 4 Drawing Sheets

(56) References Cited

U.S. PATENT DOCUMENTS

| | | | |
|---|---|---|---|
| 2010/0184407 A1* | 7/2010 | Tachikawa | 455/411 |
| 2011/0002292 A1* | 1/2011 | Wang et al. | 370/329 |
| 2011/0021212 A1* | 1/2011 | Chen et al. | 455/456.3 |
| 2012/0201186 A1* | 8/2012 | Awano | 370/312 |

FOREIGN PATENT DOCUMENTS

| | | |
|---|---|---|
| CN | 101032176 A1 | 9/2007 |
| CN | 101227649 A | 7/2008 |
| CN | 101631271 A | 1/2010 |
| CN | 101903899 A | 12/2010 |
| CN | 102006318 A | 4/2011 |

* cited by examiner

METHOD, APPARATUS AND SYSTEM FOR SENDING MESSAGES

FIELD OF THE INVENTION

The present invention relates to mobile communication technologies, and in particular, to a method, apparatus, and system for sending messages.

BACKGROUND OF THE INVENTION

With rapid development of wireless networks, more and more users access the Internet via various mobile terminals such as smart phones. As a constantly-expanding media presentation form, mobile devices such as mobile phones are capable of quickly and conveniently presenting information, which brings a drastic and revolutionary influence. Mobile phone-based Internet advertisement is becoming a critical advertisement release form, and there are huge demands especially in precise advertisement release directed to specific users. A geographical location is a major factor to be considered in advertisement release. Accordingly, it has become a hotspot issue in the field of Internet advertisement release as how to release advertisement to mobile phone users at corresponding geographical locations.

In the prior art, an Internet advertisement provider acquires registration addresses of mobile phone numbers of the mobile phone users by querying a mapping relationship between mobile phone numbers and registration locations, then groups the users into different regions according to the registration addresses, and finally releases advertisement to these users in different regions.

During the implementation of the present invention, the inventors find that the prior art has at least the following problems:

The Internet content provider acquires fixed registration addresses of the mobile phone numbers according to the mapping relationship between mobile phone numbers and registration locations. However, geographical locations of the mobile phone users are ever changing, for example, in the scenario of roaming; therefore, the Internet content provider cannot directly acquire actual geographical locations of the mobile phone users. As a result, release of advertisement to mobile phone users according to registration locations is not accurate, thereby affecting effects of the advertisement.

SUMMARY OF THE INVENTION

To improve precision on information release, an embodiment of the present invention provides a method for sending messages, including:

acquiring a destination region to which an outgoing message is to be sent;

determining a first base station identifier corresponding to the destination region, and acquiring a first unique user identifier corresponding to the first base station identifier; and sending the outgoing message to a mobile terminal of a first user, wherein the first user is a user identified by the first unique user identifier.

An embodiment of the present invention provides another method for sending messages, including:

sending a base station identifier acquisition request to a base station currently providing services;

receiving a second base station identifier sent by the base station currently providing services; and acquiring a second unique user identifier, and sending the second base station identifier and the second unique user identifier to a server such that the server sends an outgoing message according to the second unique user identifier and the second base station identifier.

An embodiment of the present invention provides a server for sending messages, including:

a destination region acquiring module, configured to acquire a destination region to which an outgoing message is to be sent;

a user identifier determining module, configured to determine a first base station identifier corresponding to the destination region, and acquire a first unique user identifier corresponding to the first base station identifier; and an outgoing message sending module, configured to send the outgoing message to a mobile terminal of a first user, where the first user is a user identified by the first unique user identifier.

An embodiment of the present invention provides a terminal for sending messages, including:

a base station identifier acquisition request sending module, configured to send a base station identifier acquisition request to a base station currently providing services;

a base station identifier receiving module, configured to receive a second base station identifier sent by the base station currently providing services;

a user identifier acquiring module, configured to acquire a second unique user identifier; and a user identifier sending module, configured to send the second base station identifier and the second unique user identifier to a server such that the server sends an outgoing message according to the second unique user identifier and the second base station identifier.

An embodiment of the present invention provides a system for sending messages, including a server for sending messages, and a terminal for sending messages.

The server for sending messages is configured to: acquire a destination region to which an outgoing message is to be sent; determine a first base station identifier corresponding to the destination region, and acquire a first unique user identifier corresponding to the first base station identifier; and send the outgoing message to a mobile terminal of a first user, where the first user is a user identified by the first unique user identifier.

The terminal for sending messages is configured to: send a base station identifier acquisition request to a base station currently providing services; receive a second base station identifier sent by the base station currently providing services; and acquire a second unique user identifier, and send the second base station identifier and the second unique user identifier to a server such that the server sends an outgoing message according to the second unique user identifier and the second base station identifier.

According to the embodiments of the present invention, a first base station identifier corresponding to the destination region is determined, a first unique user identifier corresponding to the first base station identifier is acquired, and the outgoing message is sent to the a corresponding first user, such that a server is capable of acquiring information of actual geographical location of a mobile terminal user. This improves precision in sending messages to mobile terminal users according to regions, and enhances effects of information release.

BRIEF DESCRIPTION OF THE DRAWINGS

For a better understanding of the technical solutions in the embodiments of the present invention, the accompanying drawings for illustrating the embodiments are briefly described below. Apparently, the accompanying drawings in the following description illustrate only some embodiments of the present invention, and persons of ordinary skill in the art can derive other accompanying drawings from these accompanying drawings without any creative efforts.

DETAILED DESCRIPTION OF THE INVENTION

To make the objectives, technical solutions, and advantages of the present invention clearer, the embodiments of the present invention are described in detail below with reference to the accompanying drawings.

Embodiment 1

Figure 1:
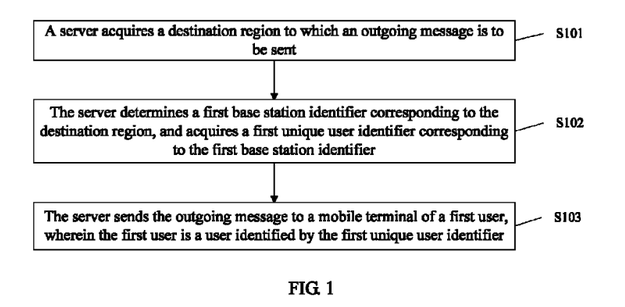
FIG. 1 is a flowchart of a method for sending messages according to Embodiment 1 of the present invention.

As illustrated in FIG. 1, an embodiment of the present invention provides a method for sending messages, including the following steps:

S101: A server acquires a destination region to which an outgoing message is to be sent.

S102: The server determines a first base station identifier corresponding to the destination region, and acquires a first unique user identifier corresponding to the first base station identifier.

S103: The server sends the outgoing message to a mobile terminal of a first user, wherein the first user is a user identified by the first unique user identifier.

According to the embodiments of the present invention, a first base station identifier corresponding to the destination region is determined, a first unique user identifier corresponding to the first base station identifier is acquired, and the outgoing message is sent to the a corresponding first user, such that a server is capable of acquiring information of actual geographical location of a mobile terminal user. This improves precision in sending messages to mobile terminal users according to regions, and enhances effects of information release.

Embodiment 2

Figure 2:
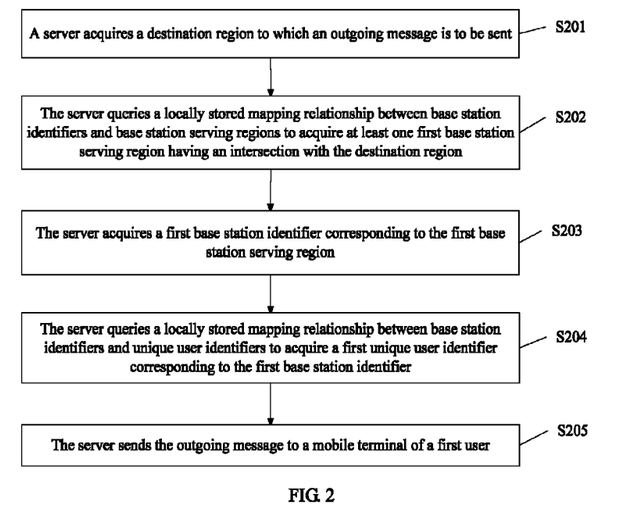
FIG. 2 is a flowchart of a method for sending messages according to Embodiment 2 of the present invention.

As illustrated in FIG. 2, an embodiment of the present invention provides a method for sending messages, including the following steps:

S201: A server acquires a destination region to which an outgoing message is to be sent.

For example, if the outgoing message is "Please all users in Haidian District in Beijing attend the legal knowledge lecture at A on Nov. 19, 2010", the destination region to which this outgoing message is to be sent is Haidian District in Beijing.

S202: The server queries a locally stored mapping relationship between base station identifiers and base station serving regions to acquire at least one first base station serving region having an intersection with the destination region.

Specifically, Table 1 lists a locally stored mapping relationship between base station identifiers and base station serving regions. When the destination region is "Haidian District in Beijing", it can be learned from Table 1 that the destination region has an intersection with the serving region when the serving region is Haidian District.

TABLE 1

| Base Station Identifier | Serving Region (Beijing) |
|---|---|
| Base station identifier 1 | Haidian District |
| Base station identifier 2 | Chaoyang District |
| Base station identifier 3 | Xicheng District |
| ... | ... |
| Base station identifier n | Dongcheng District |

S203: The server acquires a first base station identifier corresponding to the first base station serving region.

Specifically, the server queries a mapping relationship between base station identifiers and base station serving regions to acquire the first base station identifier corresponding to the first base station serving region.

For example, when the first base station serving region is Haidian District, the server queries the mapping relationship between base station identifiers and base station serving regions as listed in Table 1 to acquire that the base station identifier corresponding to the serving area Haidian District is base station identifier 1.

S204: The server queries a locally stored mapping relationship between base station identifiers and unique user identifiers to acquire a first unique user identifier corresponding to the first base station identifier.

Specifically, Table 2 lists a mapping relationship between base station identifiers and unique user identifiers. When the first base station identifier acquired by the server is base station identifier 1, the server queries Table 2 to acquire that the user unique identifier corresponding to base station identifier 1 is unique user identifier 1.

TABLE 2

| Base Station Identifier | Unique User Identifier |
|---|---|
| Base station identifier 1 | Unique user identifier 1 |
| Base station identifier 2 | Unique user identifier 2 |
| Base station identifier 3 | Unique user identifier 3 |
| ... | ... |
| Base station identifier n | Unique user identifier n |

S205: The server sends the outgoing message to a mobile terminal of a first user.

Specifically, when the mobile terminal is a mobile phone, the outgoing message may be sent to the mobile phone either in the form of an ordinary short message or in the form of other messages; and when the mobile terminal is another device, the outgoing message may be sent to the mobile terminal in such a form that the message can be received, which is not limited in this embodiment.

The first user is a user identified by the first unique user identifier.

Preferably, the provider of the outgoing message may set a sending condition for the outgoing message; the server may acquire the sending condition, and judges whether the outgoing message satisfies the sending condition; if the sending condition is satisfied, the outgoing message is sent to the mobile terminal of the first user. If the sending condition is not satisfied, the outgoing message is sent to the mobile terminal of the first user when the sending condition is satisfied.

Alternatively, the sending condition for the outgoing message may be a sending time for the outgoing message. For example, when the sending condition for outgoing message 1 is "send message 1 at 19:00 on Sep. 17, 2010", the server judges whether the current time is 19:00 on Sep. 17, 2010; if the current time is 19:00 on Sep. 17, 2010, the server sends message 1 to mobile terminal 1 according to unique user identifier 1; and if the current time is not 19:00 on Sep. 17, 2010, the server monitors—the current time, and sends message 1 to mobile terminal 1 according to unique user identifier 1 when the current time is "19:00 on Sep. 17, 2010". The server may judge, by using the existing time monitoring method, whether the current time is the preset message sending time, which is not limited in this embodiment.

Alternatively, the sending condition for the outgoing message may also be a sending object for the outgoing message. For example, when the server receives unique user identifier 1 and base station location 1 from mobile terminal 1, and acquires that base station location 1 indicates that the base station is at location 1 and the message corresponding to location 1 is message 1, and the sending condition for message 1 is "send message 1 to the user entering the serving region of the base station for the first time at location 1 in recent seven days", the server queries, according to the received unique user identifier, a record of the unique user identifier entering the serving region of the base station at location 1, and judges whether it is the first time for the mobile terminal user with the unique user identifier to enter the serving region of the base station at location 1, and if true, the server sends message 1 to the mobile terminal user.

According to the embodiments of the present invention, a first base station identifier corresponding to the destination region is determined, a first unique user identifier corresponding to the first base station identifier is acquired, and the outgoing message is sent to the a corresponding first user, such that a server is capable of acquiring information of actual geographical location of a mobile terminal user. This improves precision in sending messages to mobile terminal users according to regions, and enhances effects of information release.

Embodiment 3

Figure 3:
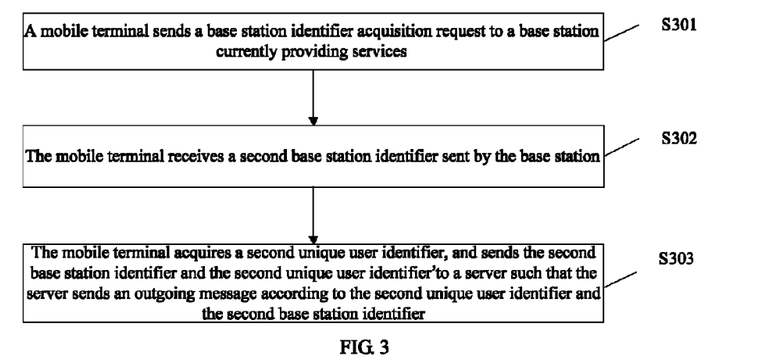
FIG. 3 is a flowchart of a method for sending messages according to Embodiment 3 of the present invention.

As illustrated in FIG. 3, an embodiment of the present invention provides a method for sending messages, including the following steps:

S301: A mobile terminal sends a base station identifier acquisition request to a base station currently providing services.

Specifically, since the current mobile network is formed by a plurality of connected base stations, the mobile terminal can acquire information such as country code, network code, region code, and current base station identifier by sending a request message to neighbor base stations, and send the information to the mobile terminal. In this embodiment, the current base station identifier needs to be at least acquired. However, acquiring more parameters to locate the mobile terminal more accurately still falls within the scope of this embodiment.

The base station current providing services for the mobile terminal refers to a base station supporting and providing mobile communication services for the mobile terminal, i.e., the mobile terminal is within the serving range of the base station. The base station identifier is a unique identifier differentiating the base station from other base stations.

Figure 4:
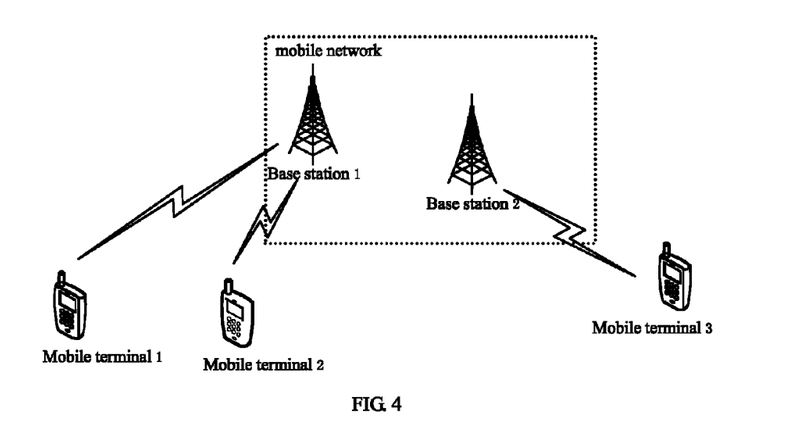
FIG. 4 is a schematic structural diagram of communication between terminals to Embodiment 3 of the present invention.

For example, as illustrated in FIG. 4, mobile terminal 1 sends a base station identifier acquisition request to base station 1 currently providing services for mobile terminal 1.

S302: The mobile terminal receives a second base station identifier sent by the base station.

Specifically, upon receiving the base station identifier acquisition request from the mobile terminal, the base station currently providing services for the mobile terminal sends the base station identifier to the mobile terminal, and the mobile terminal receives the base station identifier from the base station currently providing services.

The second base station identifier is used to identify a base station currently providing services for a mobile terminal of a second user, where the second user is a user identified by the second unique user identifier.

For example, as illustrated in FIG. 4, upon receiving the base station identifier acquisition request from mobile terminal 1, base station 1 sends base station identifier 1 to mobile terminal 1. The neighbor base stations can send information such as the country code, network code, region code, and current base station identifier to the mobile terminal S303: The mobile terminal acquires a second unique user identifier, and sends the second base station identifier and the second unique user identifier to a server such that the server sends an outgoing message according to the second unique user identifier and the second base station identifier.

Specifically, in the prior art, the mobile terminal may acquire the unique user identifier of the user using the mobile terminal by using various methods. For example, when the mobile terminal is a mobile phone, and the corresponding unique user identifier is a mobile phone number, then it can be easily acquire the mobile phone number.

The second unique user identifier is used to identify a user identity of the user using the mobile terminal user.

Preferably, the mobile terminal acquires a message sending rule, and sends a unique user identifier and the current base station identifier to the server according to the message sending rule.

Alternatively, the message sending rule may be sending the second unique user identifier and the second base station identifier at a predetermined interval, or sending the second unique user identifier and the second when the second base station identifier received by the mobile terminal is different from a locally stored base station identifier.

Specifically, when the message sending rule is sending the second unique user identifier and the second base station identifier at a predetermined interval, the mobile terminal sends the second unique user identifier and the second base station identifier to the server at the predetermined interval; and the mobile terminal sends the second unique user identifier and the second when the message sending rule is sending a unique user identifier and the current base station identifier if the second base station identifier is different from a locally stored base station identifier. For example, if the second unique user identifier acquired by mobile terminal 1 is unique user identifier 1, and the adopted message sending rule is sending the second unique user identifier and the second base station identifier at a predetermined interval, wherein the predetermined interval is T, then mobile terminal 1 acquires the current time and determine, by calculation, whether an interval between the current time and the time when the mobile terminal previously sends a unique user identifier and the current base station identifier is the predetermined interval T. If the calculated interval is the predetermined interval T, mobile terminal 1 sends unique user identifier 1 and the current base station identifier to the server; and if the calculated interval is not the predetermined interval T, mobile terminal 1 sends unique user identifier 1 and the current base station identifier to the server when the calculated interval is the predetermined interval T. For example, when the message sending rule adopted by mobile terminal 1 is sending the second unique user identifier and the second when the second base station identifier received by the mobile terminal is different from a locally stored base station identifier, where the current base station identifier received by mobile terminal 1 is base station identifier 1, and the locally stored base station identifier is base station identifier 3. When base station identifier 1 is different from base station identifier 3, mobile terminal 1 sends unique user identifier 1 and base station identifier 1 to the server; and when base station identifier is the same as base station identifier 3, mobile terminal 1 will not send unique user identifier 1 and base station identifier 1 to the server, that is, the server end still uses its currently stored unique user identifier and base station identifier.

The message sending rule may be designated by the server to the mobile terminal; or may be preconfigured in the mobile terminal in the form of hardware writing. The specific method is not limited herein. Preferably, the same mobile terminal may be configured with a plurality of message sending rules. Mobile terminal's employment of a specific rule may be determined by negotiation between the server and the mobile terminal, or may be manually configured by the user using the mobile terminal S304: The server receives the second unique user identifier and the second base station identifier from the mobile terminal For example, the unique user identifier and the current base station identifier received by the server from mobile terminal 1 are unique user identifier 1 and base station identifier 1.

S305: The server receives at least one second unique user identifier and at least one second base station identifier.

The second base station identifier is used to identify a base station currently providing services for a mobile terminal of a second user, where the second user is a user identified by the second unique user identifier.

S306: The server queries a locally stored mapping relationship between base station identifiers and unique user identifiers; if there is a third base station identifier corresponding to the second unique user identifier, step S307 is performed; and if there is no base station identifier corresponding to the second unique user identifier, step S308 is performed.

S307: The server judges whether the second base station identifier is the same as the third base station identifier; if the same, the process ends; and if different, the server deletes a mapping relationship between the second unique user identifier and the third base station identifier, and establishes a mapping relationship between the second unique user identifier and the second base station identifier.

S308: The server establishes and stores a mapping relationship between the second unique user identifier and the second base station identifier, and establishes and stores a second base station serving range corresponding to the second base station identifier.

According to the embodiments of the present invention, a first base station identifier corresponding to the destination region is determined, a first unique user identifier corresponding to the first base station identifier is acquired, and the outgoing message is sent to the a corresponding first user, such that a server is capable of acquiring information of actual geographical location of a mobile terminal user. This improves precision in sending messages to mobile terminal users according to regions, and enhances effects of information release.

Embodiment 4

Figure 5:
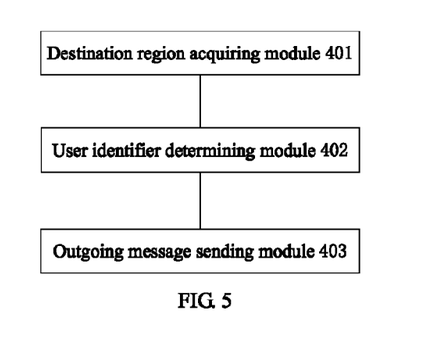
FIG. 5 is a schematic structural diagram of a server for sending messages according to Embodiment 4 of the present invention.

As illustrated in FIG. 5, an embodiment of the present invention provides a server for sending messages, including:

a destination region acquiring module 401, configured to acquire a destination region to which an outgoing message is to be sent;

a user identifier determining module 402, configured to determine a first base station identifier corresponding to the destination region, and acquire a first unique user identifier corresponding to the first base station identifier; and an outgoing message sending module 403, configured to send the outgoing message to a mobile terminal of a first user, wherein the first user is a user identified by the first unique user identifier.

According to the embodiments of the present invention, a first base station identifier corresponding to the destination region is determined, a first unique user identifier corresponding to the first base station identifier is acquired, and the outgoing message is sent to the a corresponding first user, such that a server is capable of acquiring information of actual geographical location of a mobile terminal user. This improves precision in sending messages to mobile terminal users according to regions, and enhances effects of information release.

Embodiment 5

Figure 6:
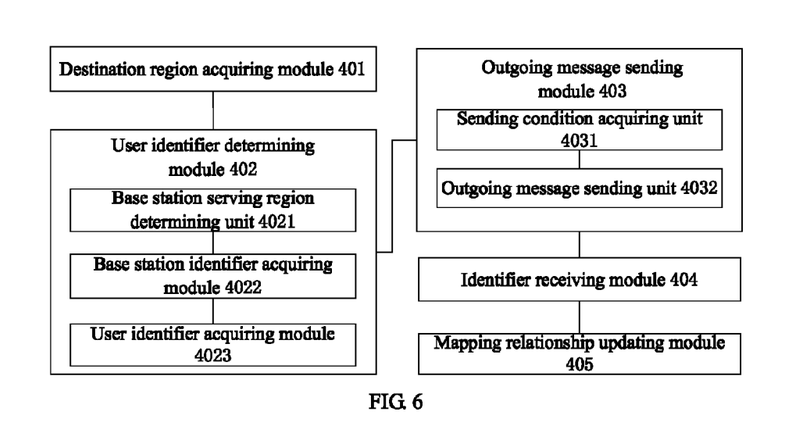
FIG. 6 is a schematic structural diagram of a server for sending messages according to Embodiment 5 of the present invention.

As illustrated in FIG. 6, an embodiment of the present invention provides a server for sending messages, wherein the server includes the destination region acquiring module 401, the user identifier determining module 402, and the outgoing message sending module 403 as described in Embodiment 4.

The user identifier determining module 402 specifically includes:

a base station serving region determining unit 4021, configured to acquire at least one first base station serving region having an intersection with the destination region;

a base station identifier acquiring module 4022, configured to query a locally stored mapping relationship between base station identifiers and base station serving regions to acquire a first base station identifier corresponding to the first base station serving region; and a user identifier acquiring module 4023, configured to query a locally stored mapping relationship between base station identifiers and unique user identifiers to acquire a first unique user identifier corresponding to the first base station identifier.

The server further includes:

an identifier receiving module 404, configured to receive at least one second unique user identifier and at least one second base station identifier, wherein the second base station identifier is used to identify a base station currently providing services for a mobile terminal of a second user, wherein the second user is a user identified by the second unique user identifier;

a mapping relationship updating module 405, configured to query a locally stored mapping relationship between base station identifiers and unique user identifiers, and if there is a third base station identifier corresponding to the second unique user identifier, judge whether the second base station identifier is the same as the third base station identifier; if the same, end the process; and if different, delete a mapping relationship between the second unique user identifier and the third base station identifier, and establish a mapping relationship between the second unique user identifier and the second base station identifier; if there is no base station identifier corresponding to the second unique user identifier, establish and store a mapping relationship between the second unique user identifier and the second base station identifier, and establish and store a second base station serving range corresponding to the second base station identifier.

The outgoing message sending module 403 specifically includes:

a sending condition acquiring unit 4031, configured to acquire a sending condition for the outgoing message; and an outgoing message sending unit 4032, configured to judge whether the outgoing message satisfies the sending condition, if the sending condition is satisfied, send the outgoing message to the mobile terminal of the first user; and if the sending condition is not satisfied, send the outgoing message to the mobile terminal of the first user when the sending condition is satisfied.

According to the embodiments of the present invention, a first base station identifier corresponding to the destination region is determined, a first unique user identifier corresponding to the first base station identifier is acquired, and the outgoing message is sent to the a corresponding first user, such that a server is capable of acquiring information of actual geographical location of a mobile terminal user. This improves precision in sending messages to mobile terminal users according to regions, and enhances effects of information release.

Embodiment 6

Figure 7:
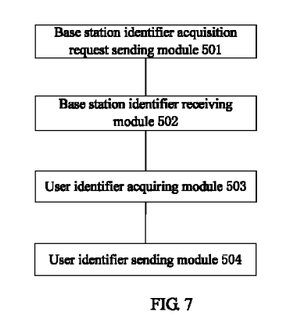
FIG. 7 is a schematic structural diagram of a terminal for sending messages according to Embodiment 6 of the present invention.

As illustrated in FIG. 7, an embodiment of the present invention provides a server for sending messages, including:

a base station identifier acquisition request sending module 501, configured to send a base station identifier acquisition request to a base station currently providing services;

a base station identifier receiving module 502, configured to receive a second base station identifier sent by the base station currently providing services;

a user identifier acquiring module 503, configured to acquire a second unique user identifier; and a user identifier sending module 504, configured to send the second base station identifier and the second unique user identifier to a server such that the server sends an outgoing message according to the second unique user identifier and the second base station identifier.

According to the embodiments of the present invention, a first base station identifier corresponding to the destination region is determined, a first unique user identifier corresponding to the first base station identifier is acquired, and the outgoing message is sent to the a corresponding first user, such that a server is capable of acquiring information of actual geographical location of a mobile terminal user. This improves precision in sending messages to mobile terminal users according to regions, and enhances effects of information release.

Embodiment 7

Figure 8:
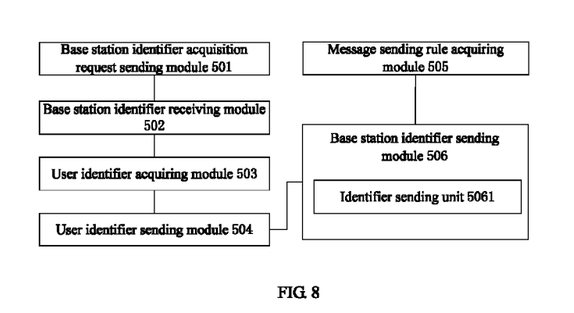
FIG. 8 is a schematic structural diagram of a terminal for sending messages according to Embodiment 7 of the present invention.

As illustrated in FIG. 8, an embodiment of the present invention provides a terminal for sending messages, where the terminal includes the base station identifier acquisition request sending module 501, the base station identifier receiving module 502, the user identifier acquiring module 503, and the user identifier sending module 504 in Embodiment 6. The terminal further includes:

a message sending rule acquiring module 505, configured to acquire a message sending rule; and a base station identifier sending module 506, configured to send the second unique user identifier and the second base station identifier to a server according to the message sending rule.

The base station identifier sending module 506 includes:

an identifier sending unit 5061, configured to when the message sending rule is sending a unique user identifier and the current base station identifier at a predetermined interval, the sending the second unique user identifier and the second base station identifier to a server according to the message sending rule; and send the second unique user identifier and the second base station identifier when the message sending rule is sending a unique user identifier and the current base station identifier if the second base station identifier is different from a locally stored base station identifier.

According to the embodiments of the present invention, a first base station identifier corresponding to the destination region is determined, a first unique user identifier corresponding to the first base station identifier is acquired, and the outgoing message is sent to the a corresponding first user, such that a server is capable of acquiring information of actual geographical location of a mobile terminal user. This improves precision in sending messages to mobile terminal users according to regions, and enhances effects of information release.

Embodiment 8

Figure 9:
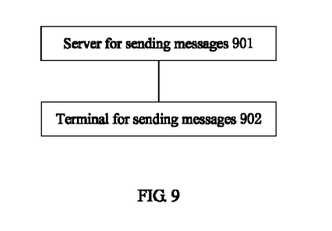
FIG. 9 is a schematic structural diagram of a system for sending messages according to Embodiment 8 of the present invention.

As illustrated in FIG. 9, an embodiment of the present invention provides a system for sending messages, including a server 901 for sending messages, and a terminal 902 for sending messages.

The server 901 for sending messages is configured to acquire a destination region to which an outgoing message is to be sent; determine a first base station identifier corresponding to the destination region, and acquire a first unique user identifier corresponding to the first base station identifier; and send the outgoing message to a mobile terminal of a first user, where the first user is a user identified by the first unique user identifier.

The terminal 902 for sending messages is configured to send a base station identifier acquisition request to a base station currently providing services; receive a second base station identifier sent by the base station currently providing services; and acquire a second unique user identifier, and send the second base station identifier and the second unique user identifier to a server such that the server sends an outgoing message according to the second unique user identifier and the second base station identifier.

According to the embodiments of the present invention, a first base station identifier corresponding to the destination region is determined, a first unique user identifier corresponding to the first base station identifier is acquired, and the outgoing message is sent to the a corresponding first user, such that a server is capable of acquiring information of actual geographical location of a mobile terminal user. This improves precision in sending messages to mobile terminal users according to regions, and enhances effects of information release.

All or part of the steps disclosed in the technical solution according to the embodiments can be implemented by software programming. The programs may be stored in a computer readable storage medium, such as a read only memory (ROM), random access memory (RAM), a magnetic disk, or a compact disc-read only memory (CD-ROM).

Described above are merely preferred embodiments of the present invention, but are not intended to limit the present invention. Any modification, equivalent replacement, or improvement made without departing from the spirit and principle of the present invention should fall within the protection scope of the present invention.

What is claimed is:

1. A method for sending messages, comprising:

acquiring a destination region to which an outgoing message is to be sent;

determining a first base station identifier corresponding to the destination region, and acquiring a first unique user identifier corresponding to the first base station identifier;

sending the outgoing message to a mobile terminal of a first user, wherein the first user is a user identified by the first unique user identifier;

receiving at least one second unique user identifier and at least one second base station identifier, wherein the second base station identifier is used to identify a base station currently providing services for a mobile terminal of a second user, wherein the second user is a user identified by the second unique user identifier;

querying a locally stored mapping relationship between base station identifiers and unique user identifiers, and if there is a third base station identifier corresponding to the second unique user identifier, judging whether the second base station identifier is the same as the third base station identifier; if the same, ending the process; and if different, deleting a mapping relationship between the second unique user identifier and the third base station identifier, and establishing a mapping relationship between the second unique user identifier and the second base station identifier;

if there is no base station identifier corresponding to the second unique user identifier, establishing and storing a mapping relationship between the second unique user identifier and the second base station identifier; and establishing and storing a second base station serving range corresponding to the second base station identifier.

2. The method according to claim 1, wherein the determining a first base station identifier corresponding to the destination region, and acquiring a first unique user identifier corresponding to the first base station identifier specifically comprise:

acquiring at least one first base station serving region having an intersection with the destination region;

querying a locally stored mapping relationship between base station identifiers and base station serving regions to acquire a first base station identifier corresponding to the first base station serving region; and querying a locally stored mapping relationship between base station identifiers and unique user identifiers to acquire a first unique user identifier corresponding to the first base station identifier.

3. The method according to claim 1, wherein the sending the outgoing message to a mobile terminal of a first user specifically comprises:

acquiring a sending condition for the outgoing message;

judging whether the outgoing message satisfies the sending condition, if the sending condition is satisfied, sending the outgoing message to the mobile terminal of the first user; and if the sending condition is not satisfied, sending the outgoing message to the mobile terminal of the first user when the sending condition is satisfied.

4. A method for sending messages, comprising:

acquiring a destination region to which an outgoing message is to be sent;

determining a first base station identifier corresponding to the destination region, and acquiring a first unique user identifier corresponding to the first base station identifier; and sending the outgoing message to a mobile terminal of a first user, wherein the first user is a user identified by the first unique user identifier;

wherein the determining a first base station identifier corresponding to the destination region, and acquiring first unique user identifier to the first base station identifier comprise:

acquiring at least one first base station serving region having an intersection with the destination region:

querying a locally stored mapping relationship between base station identifiers and base station serving regions to acquire a first base station identifier corresponding to the first base station serving region; and querying a locally stored mapping relationship between base station identifiers and unique user identifiers to acquire a first unique user identifier corresponding to the first base station identifier.

5. A server for sending messages, comprising:

a destination region acquiring module, configured to acquire a destination region to which an outgoing message is to be sent;

a user identifier determining module, configured to determine a first base station identifier corresponding to the destination region, and acquire a first unique user identifier corresponding to the first base station identifier;

an outgoing message sending module, configured to send the outgoing message to a mobile terminal of a first user, wherein the first user is a user identified by the first unique user identifier;

an identifier receiving module, configured to receive at least one second unique user identifier and at least one second base station identifier, wherein the second base station identifier is used to identify a base station currently providing services for a mobile terminal of a second user, wherein the second user is a user identified by the second unique user identifier; and a mapping relationship updating module, configured to query a locally stored mapping relationship between base station identifiers and unique user identifiers, and if there is a third base station identifier corresponding to the second unique user identifier, judge whether the second base station identifier is the same as the third base station identifier; if the same, end the process; and if different, delete a mapping relationship between the second unique user identifier and the third base station identifier, and establish a mapping relationship between the second unique user identifier and the second base station identifier; if there is no base station identifier corresponding to the second unique user identifier, establish and store a mapping relationship between the second unique user identifier and the second base station identifier, and establish and store a second base station serving range corresponding to the second base station identifier.

6. The server according to claim 5, wherein the user identifier determining module specifically comprises:

a base station serving region determining unit, configured to acquire at least one first base station serving region having an intersection with the destination region;

a base station identifier acquiring module, configured to query a locally stored mapping relationship between base station identifiers and base station serving regions to acquire a first base station identifier corresponding to the first base station serving region; and a user identifier acquiring module, configured to query a locally stored mapping relationship between base station identifiers and unique user identifiers to acquire a first unique user identifier corresponding to the first base station identifier.

7. The server according to claim 5, wherein the outgoing message sending module specifically comprises:

a sending condition acquiring unit, configured to acquire a sending condition for the outgoing message; and an outgoing message sending unit, configured to judge whether the outgoing message satisfies the sending condition, if the sending condition is satisfied, send the outgoing message to the mobile terminal of the first user; and if the sending condition is not satisfied, send the outgoing message to the mobile terminal of the first user when the sending condition is satisfied.

8. A server for sending messages, comprising:

a destination region acquiring module, configured to acquire a destination region to which an outgoing message is to be sent;

a user identifier determining module, configured to determine a first base station identifier corresponding to the destination region, and acquire a first unique user identifier corresponding to the first base station identifier; and an outgoing message sending module, configured to send the outgoing message to a mobile terminal of a first user, wherein the first user is a user identified by the first unique user identifier;

wherein the user identifier determining module comprises:

a base station serving region determining unit, configured to acquire at least one first base station serving region having an intersection with the destination region;

a base station identifier acquiring module, configured to query a locally stored mapping relationship between base station identifiers and base station serving regions to acquire a first base station identifier corresponding first base station serving region; and a user identifier acquiring module, configured to query a locally stored mapping relationship between base station identifiers and unique user identifiers to acquire a first unique user identifier corresponding to the first base station identifier.

* * * * *